United States Patent
Karnik et al.

(10) Patent No.: US 11,449,392 B2
(45) Date of Patent: Sep. 20, 2022

(54) DATA BACKUP SYSTEM WITH BLOCK SIZE OPTIMIZATION

(71) Applicant: Druva Inc., Sunnyvale, CA (US)

(72) Inventors: Ashish Karnik, Pune (IN); Somesh Jain, Pune (IN)

(73) Assignee: DRUVA INC., Sunnyvale, CA (US)

( * ) Notice: Subject to any disclaimer, the term of this patent is extended or adjusted under 35 U.S.C. 154(b) by 106 days.

(21) Appl. No.: 17/035,262

(22) Filed: Sep. 28, 2020

(65) Prior Publication Data
US 2021/0224162 A1   Jul. 22, 2021

(30) Foreign Application Priority Data
Jan. 21, 2020 (IN) .............................. 202041002699

(51) Int. Cl.
*G06F 12/00* (2006.01)
*G06F 11/14* (2006.01)
*G06F 3/06* (2006.01)

(52) U.S. Cl.
CPC .......... *G06F 11/1461* (2013.01); *G06F 3/064* (2013.01); *G06F 3/067* (2013.01); *G06F 3/0619* (2013.01); *G06F 11/1451* (2013.01); *G06F 11/1453* (2013.01); *G06F 11/1464* (2013.01); *G06F 11/1469* (2013.01)

(58) Field of Classification Search
None
See application file for complete search history.

(56) References Cited

U.S. PATENT DOCUMENTS

| 9,471,245 | B1 * | 10/2016 | Shilane | G06F 3/067 |
| 2020/0349012 | A1 * | 11/2020 | Chopra | G06F 9/547 |

* cited by examiner

*Primary Examiner* — Daniel D Tsui
(74) *Attorney, Agent, or Firm* — IceMiller LLP (57) ABSTRACT

A system for data backup is provided. The system includes a memory having computer-readable instructions stored therein and a processor configured to execute the computer-readable instructions to receive a request for full data and/or incremental backup for a volume and to perform a full backup of the volume based on a first block size in response to a full data backup request. The processor is configured to generate a digital fingerprint of the full backup and determine if the full backup exists on a backup media based on the generated digital fingerprint and to upload the full backup to the backup media if it is determined that the first backup is unavailable on the backup media and perform an incremental backup of the volume based on a second block size in response to an incremental backup request. The second block size is substantially smaller than the first block size.

19 Claims, 4 Drawing Sheets

DATA BACKUP SYSTEM WITH BLOCK SIZE OPTIMIZATION

PRIORITY STATEMENT

The present application claims priority under 35 U.S.C. § 119 to Indian patent application number 202041002699 filed 21 Jan. 2020, the entire contents of which are hereby incorporated herein by reference.

FIELD

The invention relates generally to data backup systems, and more particularly to, techniques for dynamic block size selection for performing full and incremental data backups.

BACKGROUND

Computer systems may be subjected to various disruptions and failures which may result in loss of data. Data backup systems are employed to perform data backup for such systems either manually or automatically on a periodic basis to prevent loss of data in an event of failure and to facilitate recovery of such data.

In general, performing full data backups of a system may be very time consuming and may not be cost effective. One way to reduce the time and associated costs is to perform incremental backups in between the full data backups.

Typically, for backing the data for such computer systems and servers, a user or IT administrator of the data backup systems may have to choose block size for the backup. In general, selection of block size is a trade-off and can be a challenge based upon a type of the data backup. For example, selecting a smaller block size may allow for tracking modifications at a high granularity and may result in lower size of incremental backup. Alternatively, selecting a large block size may reduce data write request cost and data storage cost in some cases.

Moreover, for certain backup workloads, it may be expected to achieve substantial data deduplication for a first backup and relatively lesser data deduplication for incremental backups. It may be a challenge to select an appropriate block size for the backups while achieving efficient data deduplication.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for data backup is provided. The system includes a memory having computer-readable instructions stored therein and a processor configured to execute the computer-readable instructions to receive a request for full data and/or incremental backup for a volume and to perform a full backup of the volume based on a first block size in response to a full data backup request. The processor is further configured to generate a digital fingerprint of the full backup and determine if the full backup exists on a backup media based on the generated digital fingerprint. The processor is also configured to upload the full backup to the backup media if it is determined that the first backup is unavailable on the backup media and perform an incremental backup of the volume based on a second block size in response to an incremental backup request, wherein the second block size is substantially smaller than the first block size.

According to another example embodiment, a system for full and/or incremental data backup is provided. The system includes a storage device having one or more volumes. The system also includes a memory having computer-readable instructions stored therein and a processor configured to execute the computer-readable instructions to receive a request for data backup for the one or more volumes of the storage device and to determine if the request corresponds to a full data backup or an incremental data backup of the one or more volumes. The processor is further configured to select a block size for the data backup based upon a type of backup and perform the data backup of the one or more volumes based on the selected block size. The full data backup is performed at a first block size and the incremental data backup is performed at a second block size, the second block size being substantially smaller as compared to the first block size. The processor is further configured to upload the data backup to a backup media and/or update one or more block maps for the one or more volumes, wherein the one or more block maps track changed blocks for the corresponding volumes.

According to another example embodiment, a computer-implemented method for performing a full and/or incremental data backup of a storage device. The method includes accessing a storage device having one or more volumes and receiving a request for a full data backup or an incremental data backup for the one or more volumes of the storage device. The method further includes dynamically selecting a block size for the data backup based upon a type of backup and performing the data backup based on the selected block size. The full data backup is performed at a first block size and the incremental data backup is performed at a second block size. The method also includes uploading the data backup to a backup media and/or updating one or more block maps for the one or more volumes, wherein the one or more block maps track changed blocks for the corresponding volumes.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to data backup solutions and more particularly to, a system for data backup with dynamic block size optimization for full and incremental data backups.

Figure 1:
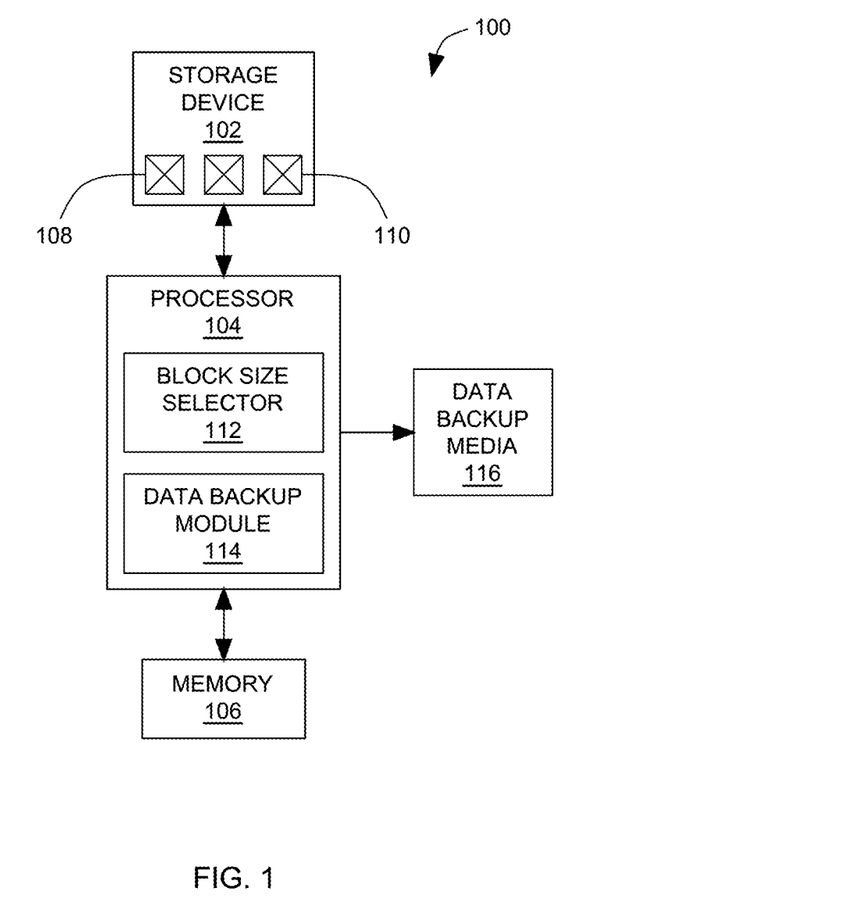
FIG. 1 illustrates a system for full and/or incremental data backup for a storage device in accordance with embodiments of the present technique.

FIG. 1 illustrates a system for full and/or incremental data backup 100 for a storage device 102 in accordance with embodiments of the present technique. The system 100 includes a processor 104, and a memory 106. Each component of the system 100 is described in further detail below.

In the illustrated embodiment, the system 100 is communicatively coupled to the storage device 102 and is configured to dynamically select a block size for data backup in response to a request for a full and/or incremental data backup. The storage device 102 may include a single server, multiple server, a data storage site, or combinations thereof. In this example, the storage device includes one or more volumes such as represented by reference numerals 108 and 110. In operation, the processor 104 receives a request for data backup for the one or more volumes 108 and 110 from a user of the system 100.

The processor 104 includes a block size selector 112 configured to receive the request for data backup and to determine if the request corresponds to a full data backup or an incremental backup of the one or more volumes 108 and 110. The block size selector 112 is configured to select a block size for the data backup based upon the type of backup. The block size selector 112 may be configured to receive a user input for the block size. The processor 104 further includes a data backup module 114 configured to perform the data backup of the one or more volumes 108 and 110 based on the selected block size. In this example, the block size selector 112 selects a first block size for the full data backup of the one or more volumes 108 and 110. Moreover, the block size selector 112 is configured to select a second block size for the incremental backup. It should be noted that the second block size is substantially smaller as compared to the first block size.

The data backup module 114 is configured to upload the data backup to a backup media 116. As will be appreciated by one skilled in the art, the backup media 116 may be an on-premise data storage site, a private cloud, a public cloud, or combinations thereof. However, other types of backup media 116 may be envisaged.

In this example, the data backup module 114 is configured to perform a full backup of the one or more volumes 108 and 110 based on the first block size in response to the full data backup request. In operation, a digital fingerprint of the full backup is generated. In some examples, a hash function may be used to generate the digital fingerprint. For example, the digital fingerprint of the full backup may be generated using secure hash algorithm. Further, the data backup module 114 is configured to determine if the full backup exists on the backup media 116 based on the generated digital fingerprint. The data backup module 114 is configured to upload the data backup to the backup media 116 if it is determined that the full backup is unavailable on the backup media 116. In one embodiment, the data backup module 114 is configured to perform an incremental backup of the one or more volumes 108 and 110 based on the second block size in response to an incremental backup request.

In some examples, the data backup module 114 is configured to identify one or more changed blocks of the one or more volumes 108 and 110. In this embodiment, the changed blocks are uploaded to the backup media 116 by the data backup module 114. Moreover, a block map may be updated corresponding to the one or more changed blocks. The block map may be maintained and stored in the backup media 116.

In some examples, the data backup module 114 is configured to perform data deduplication for the full backup based on the first block size. The option for data deduplication may be pre-selected by a user of the system 100. In some other embodiments, the data backup module 114 is configured to receive a data deduplication request from a user for the incremental backup. In response, the data backup module 114 is configured to perform data deduplication for the incremental backup. In some examples, the data backup module 114 is configured to perform a background analysis of one or more changed blocks of the one or more volumes 108 and 110 and recommend if a data deduplication is required for the incremental backup based upon the background analysis. If the recommendation based upon the background analysis is to perform data deduplication, the data backup module 114 proceeds to perform data deduplication for the incremental data backup.

Figure 2:
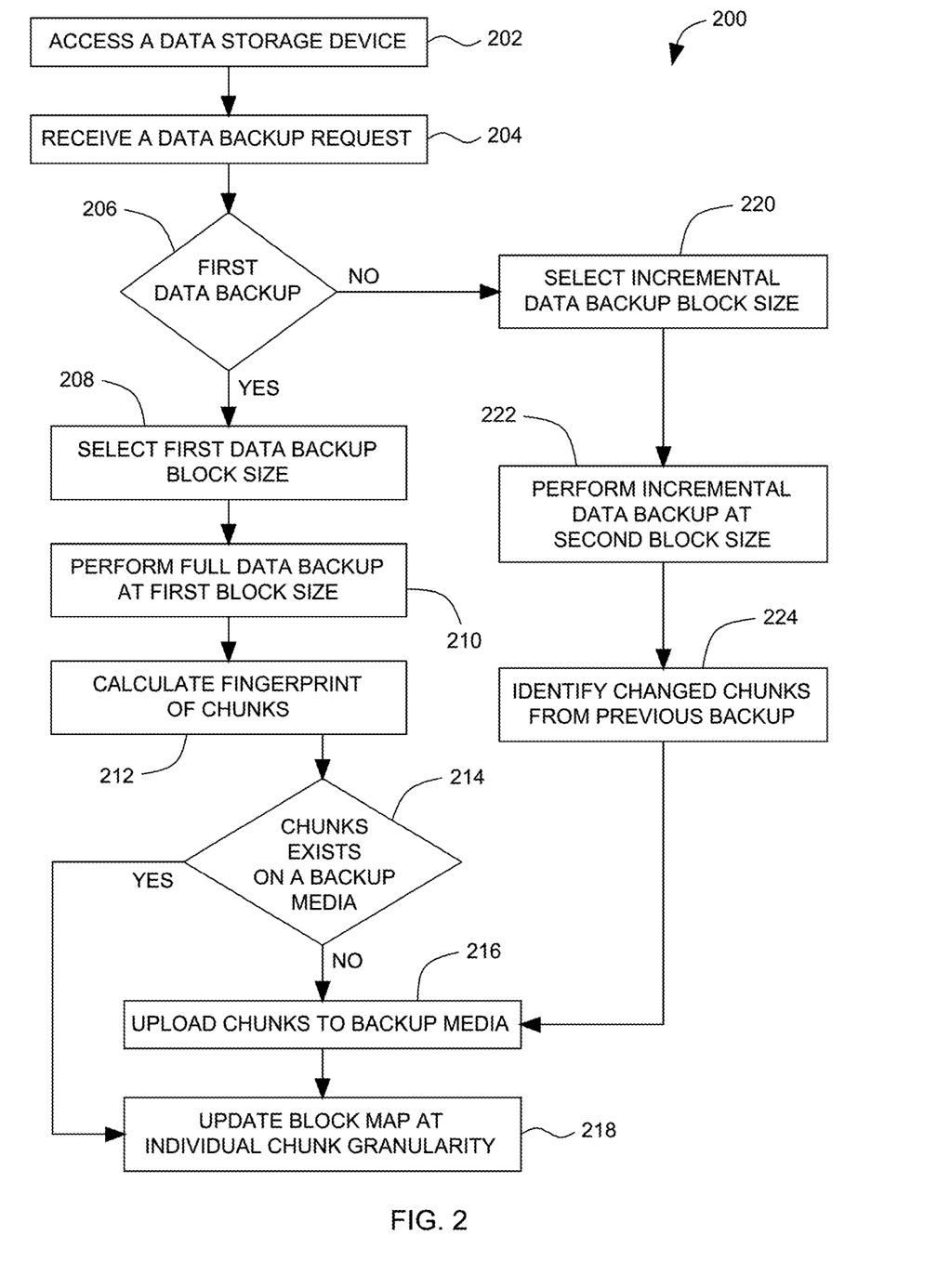
FIG. 2 is a flow diagram for illustrating a computer-implemented process for performing a full and/or incremental data backup of a storage device, using the system of FIG. 1, according to the aspects of the present technique.

FIG. 2 is a flow diagram for illustrating a computer-implemented process 200 for performing a full and/or incremental data backup of a storage device, using the system 100 of FIG. 1, according to the aspects of the present technique. At block 202, a data storage device is accessed. The data storage device may include one or more volumes. At block 204, a data backup request is received by the system 100. At block 206, it is determined if the data backup request corresponds to a first backup (full backup) for the data storage device. If it is determined that the data backup request corresponds to a first/full data backup, then a first block size corresponding to the first data backup is selected by a block size selector (block 208). At block 210, a full backup is performed of the one or more volumes of the data storage device using a data backup module. The full backup is performed based on the first block size. In some examples, a data deduplication may be performed for the full backup based on the first block size.

In this example, the block size selector is configured to select the first block size that may be relatively large to reduce cost associated with input-output (write) operations. In some examples, the first block size may be determined based upon historical information of dedup ratio for different block sizes. Here, by analyzing pattern of backup data, the system can regularly learn and select an appropriate first block size to facilitate incremental changes to be as small as possible. Moreover, the block size selector is configured to select the second block size to be substantially similar to block size of volume being backed up.

At block 212, a fingerprint of the chunks is estimated. Further, it is determined which chunks already exist on a backup media based on a fingerprint (block 214). If it is determined that the chunk does not exist on the backup media, then the chunk is uploaded to the backup media (block 216). Further, the block map is updated for the chunk (block 218). Alternatively, if it is determined that the chunk exists on the backup media, then for each chunk of data block map is updated accordingly (block 218).

At block 206, if it is determined that the data backup request does not corresponds to a first data backup, then a second block size corresponding to the incremental data backup is selected by the block size selector (block 220). In this example, the second block size is substantially smaller than the first block size. At block 222, an incremental data backup is performed of the one or more volumes of the data storage device using a data backup module. The incremental data backup is performed based on the second block size. Further, at block 224, the changed chunks of data from the previous backup may be identified and the block map may be updated accordingly (blocks 216 and 218). In some examples, data deduplication may be performed for the incremental data backup in response to a data deduplication request for the incremental data backup.

Figure 3:
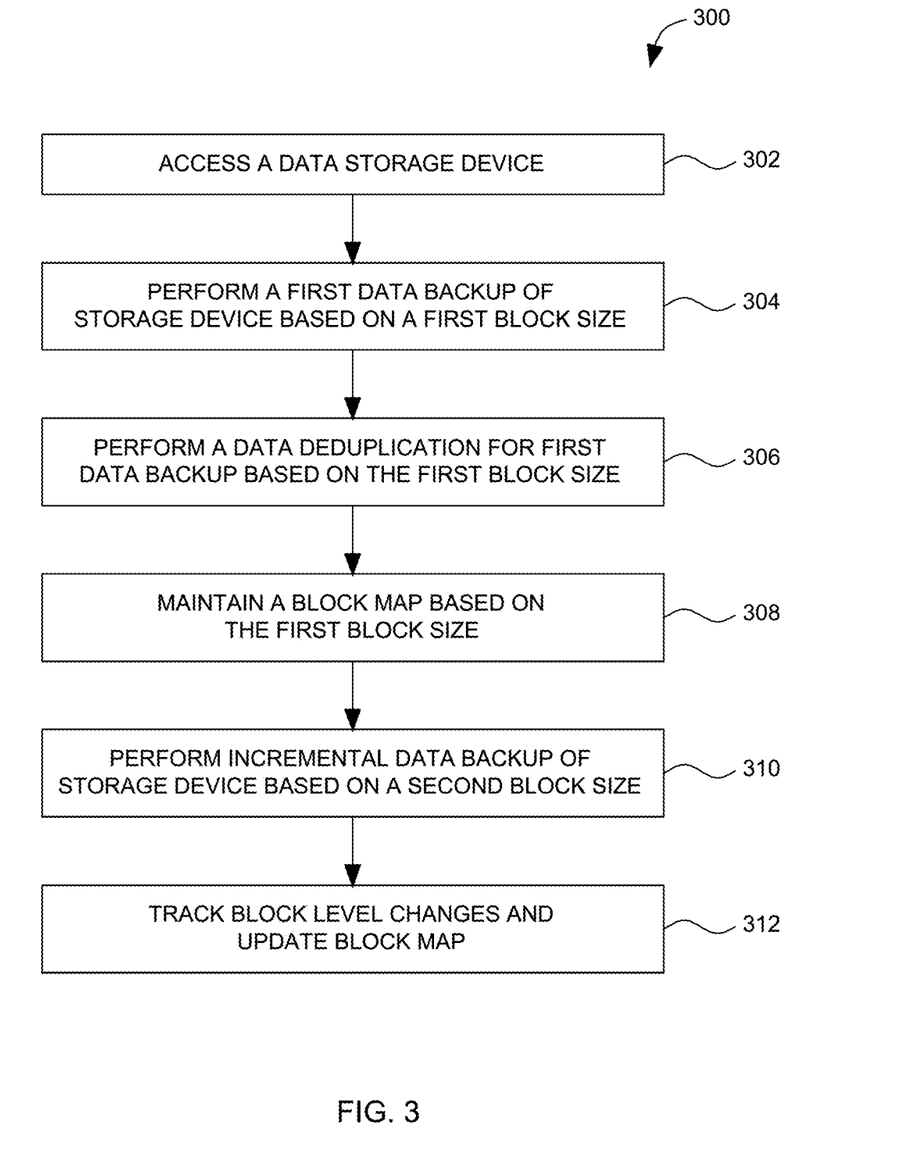
FIG. 3 is a flow diagram for illustrating a process for performing data backup of a storage device, using the system of FIG. 1, according to the aspects of the present technique.

FIG. 3 is a flow diagram for illustrating a process 300 for performing data backup of a storage device, using the system 100 of FIG. 1, according to the aspects of the present technique. At block 302, a data storage device is accessed. At block 304, a first backup is performed of the one or more volumes of the data storage device using a data backup module. The first backup is performed based on a first block size. The first block size may be set to a relatively larger block size for performing a full data backup. For example, the first block size may be set to be at about 8 MB for performing the first backup.

In this example, a data deduplication is performed for the first backup based on the first block size (block 306). Moreover, a block map is maintained at the first block size (block 308). At block 310, an incremental data backup is performed of the one or more volumes of the data storage device using the data backup module. The incremental backup is performed based on a second block size. The second block size may be selected to be a relatively smaller block size for tracking the modifications at block map granularity (block 312). For example, the second block size may be set to be at about 8 kB for performing the incremental backup. In this example, the data deduplication may be turned off. However, based on a user defined setting, data deduplication may be performed for the incremental data backup. In certain embodiments, if no data deduplication is expected between similar workloads such as database files, the data deduplication may be avoided for the first backup.

The modules of the proactive data recovery system 100 described herein are implemented in computing devices. One example of a computing device 400 is described below in FIG. 4. The computing device includes one or more processor 402, one or more computer-readable RAMs 404 and one or more computer-readable ROMs 406 on one or more buses 508. Further, computing device 400 includes a tangible storage device 410 that may be used to execute operating systems 420 and the data backup system 100. The various modules of the data backup system 100 include, a processor 10 and a memory 106. Both, the operating system 420 and the storage system 100 are executed by processor 402 via one or more respective RAMs 404 (which typically includes cache memory). The execution of the operating system 420 and/or the system 100 by the processor 402, configures the processor 402 as a special purpose processor configured to carry out the functionalities of the operation system 420 and/or the data backup system 100, as described above.

Figure 4:
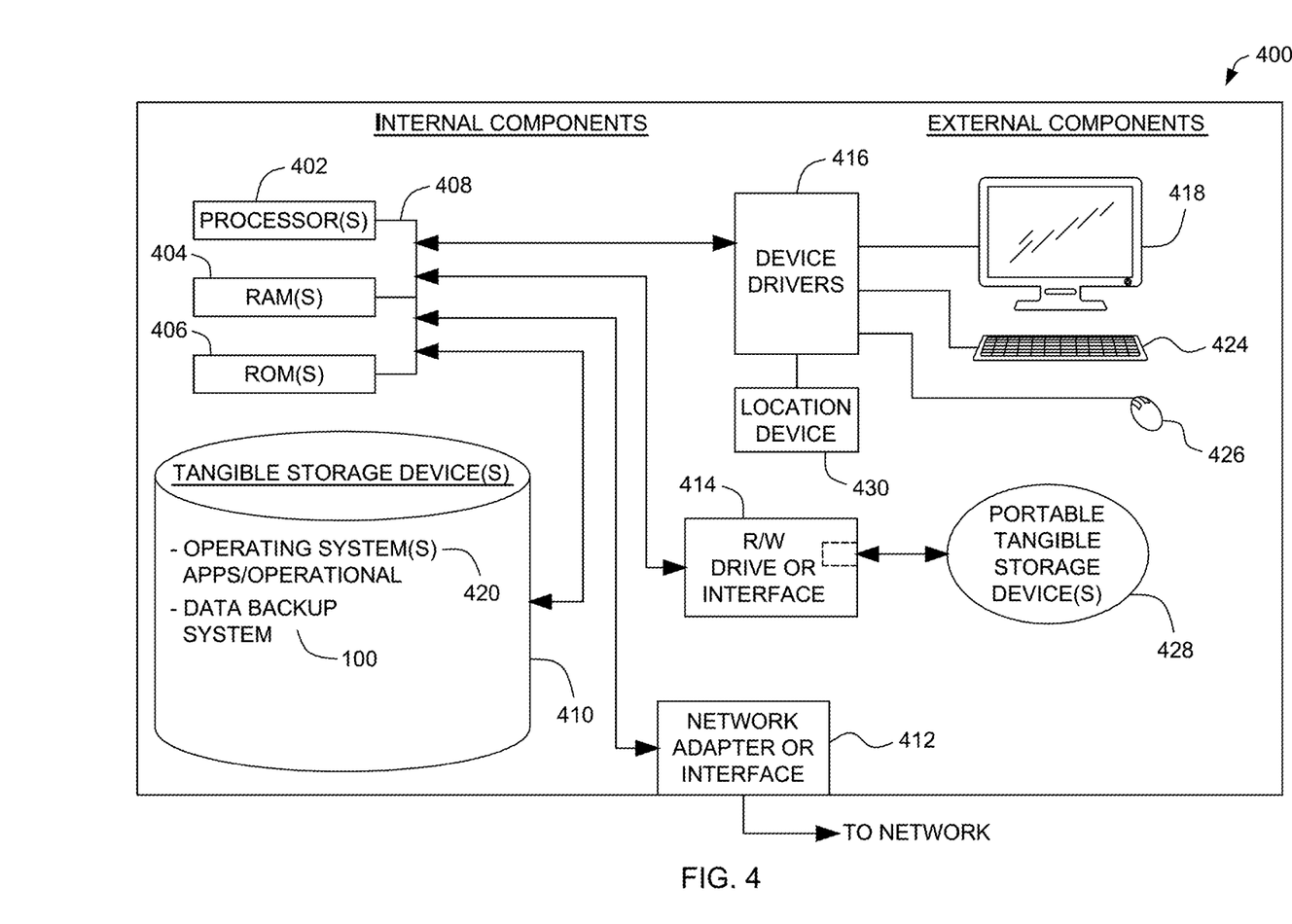
FIG. 4 is a block diagram of an embodiment of a computing device in which the modules of the data backup system, described herein, are implemented.

Examples of storage devices 410 include semiconductor storage devices such as ROM 506, EPROM, flash memory or any other computer-readable tangible storage device that may store a computer program and digital information.

Computing device also includes a R/W drive or interface 414 to read from and write to one or more portable computer-readable tangible storage devices 428 such as a CD-ROM, DVD, memory stick or semiconductor storage device. Further, network adapters or interfaces 412 such as a TCP/IP adapter cards, wireless Wi-Fi interface cards, or 3G or 4G wireless interface cards or other wired or wireless communication links are also included in computing device.

In one example embodiment, the system 100 which includes a, a processor 104 with the block size selector 112 and the data backup module 114, and memory 106, may be stored in tangible storage device 410 and may be downloaded from an external computer via a network (for example, the Internet, a local area network or other, wide area network) and network adapter or interface 412.

Computing device further includes device drivers 416 to interface with input and output devices. The input and output devices may include a computer display monitor 418, a keyboard 424, a keypad, a touch screen, a computer mouse 426, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A system for data backup, the system comprising: a memory having computer-readable instructions stored therein; and a processor configured to execute the computer-readable instructions to:
    receive a request for full data and/or incremental backup for a volume;
    perform a full backup of the volume based on a first block size in response to a full data backup request;
    generate a digital fingerprint of the full backup;
    determine if the full backup exists on a backup media based on the generated digital fingerprint;
    upload the full backup to the backup media if it is determined that the first backup is unavailable on the backup media;
    perform an incremental backup of the volume based on a second block size in response to an incremental backup request, wherein the second block size is substantially smaller than the first block size;
    receive a data deduplication request for the full and/or incremental backup; and
    perform the requested deduplication for the full and/or incremental backup based on a corresponding block size.

2. The system of claim 1, wherein the processor is configured to execute the computer-readable instructions to:
    identify one or changed blocks of the volume for the incremental backup;

upload the one or more changed blocks to the backup media; and
update a block map corresponding to the one or more changed blocks.

3. The system of claim 1, wherein the data deduplication is performed for the full backup based on the first block size.

4. The system of claim 1, wherein the processor is configured to execute the computer-readable instructions to upload the full backup and/or the incremental backup to a private cloud, a public cloud, an on-site backup media, an off-site backup media, or combinations thereof.

5. The system of claim 1, wherein the data deduplication request is received from a user for the incremental backup; and
wherein the data deduplication is performed for the incremental backup in response to the data deduplication request.

6. The system of claim 5, wherein the processor is configured to execute the computer-readable instructions to:
perform a background analysis of one or more changed blocks of the volume;
recommend if a data deduplication is required for the incremental backup; and
perform data deduplication for the incremental backup based on the recommendation from the background analysis.

7. The system of claim 1, wherein the processor is configured to execute the computer-readable instructions to perform a backup of a file system, a virtual disk, a data storage platform, a network storage device, or combinations thereof.

8. The system of claim 1, wherein the processor is further configured to execute the computer-readable instructions to generate the digital fingerprint of the full backup using secure hash algorithm.

9. The system of claim 1, wherein the processor is further configured to execute the computer-readable instructions to update block map of the blocks of the first backup if it is determined that the first backup is available on the backup media.

10. A system for full and/or incremental data backup comprising:
a memory having computer-readable instructions stored therein;
a storage device having one or more volumes;
a processor configured to execute the computer-readable instructions to:
receive a request for data backup for the one or more volumes of the storage device;
determine if the request corresponds to a full data backup or an incremental data backup of the one or more volumes;
select a block size for the data backup based upon a type of backup;
perform the data backup of the one or more volumes based on the selected block size, wherein the full data backup is performed at a first block size and the incremental data backup is performed at a second block size, the second block size being substantially smaller as compared to the first block size;
upload the data backup to a backup media and/or update one or more block maps for the one or more volumes, wherein the one or more block maps track changed blocks for the corresponding volumes;
receive a data deduplication request for the full and/or incremental data backup; and
perform the data deduplication for the full and/or incremental data backup based on a corresponding block size.

11. The system of claim 10, wherein the processor is further configured to execute the computer-readable instructions to:
perform full backup of the one or more volumes based on the first block size;
generate a digital fingerprint of the full backup;
determine if the full backup exists on a backup media based on the generated digital fingerprint; and
upload the full backup to the backup media if it is determined that the first backup is unavailable on the backup media.

12. The system of claim 11, wherein the processor is further configured to execute the computer-readable instructions to generate the digital fingerprint of the full backup using secure hash algorithm.

13. The system of claim 10, wherein the processor is configured to execute the computer-readable instructions to:
identify one or changed blocks of the one or more volumes for the incremental backup;
upload the one or more changed blocks to the backup media; and
update the block map corresponding to the one or more changed blocks.

14. The system of claim 10, wherein the processor is further configured to execute the computer-readable instructions to selectively perform data deduplication for the full data backup and/or the incremental data backup.

15. The system of claim 10, wherein the backup media comprises a cloud, or a virtual disk, or combinations thereof.

16. A computer-implemented method for performing a full and/or incremental data backup of a storage device, the method comprising:
accessing a storage device having one or more volumes;
receiving a request for a full data backup or an incremental data backup for the one or more volumes of the storage device;
dynamically selecting a block size for the data backup based upon a type of backup;
performing the data backup based on the selected block size, wherein the full data backup is performed at a first block size and the incremental data backup is performed at a second block size;
uploading the data backup to a backup media and/or updating one or more block maps for the one or more volumes, wherein the one or more block maps track changed blocks for the corresponding volumes;
receiving a data deduplication request for the full and/or incremental data backup; and
performing the data deduplication for the full and/or incremental data backup based on a corresponding block size.

17. The computer implemented method of claim 16, further comprising:
generating a digital fingerprint of the full backup of the one or more volumes;
determining if the full backup exists on a backup media based on the generated digital fingerprint; and
upload the full backup to the backup media if it is determined that the first backup is unavailable on the backup media.

18. The computer implemented method of claim 16, wherein the second block size is substantially smaller as compared to the first block size.

19. The computer implemented method of claim 16, further comprising:
   identifying one or more changed blocks of the one or more volumes for the incremental backup;
   uploading the one or more changed blocks to the backup media; and
   updating the block map corresponding to the one or more changed blocks.

\* \* \* \* \*